(12) United States Patent
Sun

(10) Patent No.: US 9,969,111 B2
(45) Date of Patent: May 15, 2018

(54) ONE-PIECE DECORATIVE TRIM BEZEL HAVING PLURAL UNPAINTED FINISHES

(71) Applicant: FORD GLOBAL TECHNOLOGIES, LLC, Dearborn, MI (US)

(72) Inventor: Haoliang Michael Sun, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 633 days.

(21) Appl. No.: 14/098,015

(22) Filed: Dec. 5, 2013

(65) Prior Publication Data

US 2014/0117579 A1 May 1, 2014

Related U.S. Application Data

(62) Division of application No. 13/050,030, filed on Mar. 17, 2011, now abandoned.

(51) Int. Cl.
*C25D 5/02* (2006.01)
*B29C 45/16* (2006.01)
*C25D 7/02* (2006.01)
*B29C 45/00* (2006.01)
*B29L 31/30* (2006.01)

(52) U.S. Cl.
CPC .......... *B29C 45/16* (2013.01); *B29C 45/0053* (2013.01); *C25D 5/02* (2013.01); *C25D 7/02* (2013.01); *B29C 2045/0079* (2013.01); *B29L 2031/3005* (2013.01)

(58) Field of Classification Search
CPC ............... C25D 3/04; C25D 5/02; C25D 7/00
USPC .................................................. 205/118, 164
See application file for complete search history.

(56) References Cited

U.S. PATENT DOCUMENTS

| 8,636,940 | B2* | 1/2014 | Kreiner | ................. | B01D 29/111 |
| | | | | | 210/232 |
| 2001/0040002 | A1* | 11/2001 | Kuehn | ................ | B29C 45/1603 |
| | | | | | 156/244.11 |
| 2006/0058910 | A1* | 3/2006 | McBain | .............. | B29C 45/7693 |
| | | | | | 700/197 |
| 2006/0226574 | A1* | 10/2006 | Bozio | ................. | B29C 45/1639 |
| | | | | | 264/248 |
| 2007/0246967 | A1* | 10/2007 | Lynam | .................. | B60J 5/0404 |
| | | | | | 296/146.1 |

(Continued)

OTHER PUBLICATIONS

Cycolac MG37EPX Resin datasheet, last updated Aug. 6, 2010.*

*Primary Examiner* — Brian W Cohen
(74) *Attorney, Agent, or Firm* — LeClairRyan PLLC

(57) ABSTRACT

A one-piece trim bezel formed from multiple components. In the event of two co-molded components, the first co-molded part is composed of a polymerized material having an unpainted surface that may be a high gloss smooth surface or a textured low gloss surface and the second co-molded part, formed with the first part, is composed of a plateable plastic material. The plateable plastic material may be plateable with chrome. A multiple-shot injection molding process is used to form the one-piece trim bezel which joins the first co-molded part and the second co-molded part in one operation. The formed part is then subjected to a plating process during which time only the chrome deposits on the surface of the plateable plastic material of the second co-molded part while the surface of the first co-molded part remains unplated.

18 Claims, 3 Drawing Sheets

(56) References Cited

U.S. PATENT DOCUMENTS

2012/0156442 A1* 6/2012 Reeder ............... B29C 45/0053
428/195.1

* cited by examiner

ONE-PIECE DECORATIVE TRIM BEZEL HAVING PLURAL UNPAINTED FINISHES

CROSS-REFERENCE TO RELATED APPLICATIONS

This application is a divisional application of U.S. application Ser. No. 13/050,030 (filed Mar. 17, 2011), which is hereby incorporated by reference.

TECHNICAL FIELD

The present invention relates generally to trim bezels for vehicles. More particularly, the present invention relates to unpainted one-piece trim bezels for vehicles comprising a chrome-plated finish and an un-painted and un-plated finish.

BACKGROUND OF THE INVENTION

It is known to include trim bezels in the interiors of vehicles of all types. Decorative trim bezels are often desired by the styling designer to compliment a particular surface, to highlight a feature, or to differentiate vehicle series. Trim bezel designs with multiple surface finishes have become increasingly popular in vehicle design studios. For example, it is common in vehicle interiors to find a single trim bezel comprising two or more connected parts with one of the parts having a high gloss surface (such as a high gloss piano black surface) or low-gloss textured surface adjacent to a thin, chrome-plated ring surrounding the periphery.

An example of such a known two-piece trim bezel is illustrated in FIG. 1 which illustrates a trim bezel, generally illustrated as 10, which includes a first part 12 having a high gloss finish or a textured low gloss finish and a second part 14 having a chrome-plated finish. The first part 12 is produced conventionally by injection molding with its black high gloss finish ordinarily being the result of a base color coat and a layer of clear coat. The first part 12 and the second part 14 are thus separate parts, as illustrated in FIG. 2, which are then snap-fitted or heat staked together to form a single component for installation into the interior of the vehicle.

While providing a satisfactory trim bezel, the known two-piece approach suffers from several drawbacks. One of them is the high cost resulting from multiple pieces and the necessary labor to attach the two parts together. Another problem is inherent with two closely positioned pieces which inherently has the high risk of squeaking or rattling when the vehicle is in motion, particularly over time as the vehicle age advances. An additional problem of known two-piece assemblies is the potential for a poor surface appearance caused by any of several painting defects, including orange peel, sag, paint spits, and the like. Still a further problem inherent in known manufacturing processes of two-piece bezels is the negative environmental impact generated by VOC of painting as is well known.

As an alternative to the two-piece approach, it is known to injection mold a single piece followed by masking of the area to be plated. The masked part is then painted with a coating-resistant paint applied to the area not requiring chrome plating. The piece is then electroplated with the chrome plate adhering to the non-painted areas. Once electrocoated, the part is then cleaned, masked and painted again, this time with a high gloss finish coat, such as common piano black. While having certain desirable aspects, this approach requires a long supply chain and suffers from labor-intensive steps including repeated masking and painting processes and the difficult-to-avoid result of having a rough-cut line between the chrome finish and the high gloss finish due to limitations of the chrome coating-resistant paint.

Accordingly, for both known methods discussed above in which the two-piece component or the single-piece component is masked, painted, plated and painted again, both inconsistent and poor quality and high labor and production costs are known problems.

As in so many areas of vehicle technology, there is room for improvement in the manufacture of vehicle decorative trim bezels. Such improvements ideally include labor cost and component cost reductions with an associated improvement in trim bezel quality.

SUMMARY OF THE INVENTION

The disclosed invention provides a one-piece trim bezel formed from two or more co-molded components. Where two co-molded components are involved, the first co-molded part is composed of a polymerized material having an unpainted high gloss surface or a textured low gloss surface and the second co-molded part, formed with the first part, is composed of a plateable plastic material. The plateable plastic material can be selected from the group consisting of ABS, PC/ABS or any polymerizable that can be plated. The second co-molded part is composed of any polymerizable material that will not take a deposition of chrome plating. This component may be, for example, a polycarbonate (PC) or a PC blend in which the majority of the component is PC. Regardless of the material, in the two co-molded component construct the second co-molded part is co-molded with the said first co-molded part to form a single piece trim bezel. The color of the polymerized material of the first co-molded part may be selected from a variety of colors, such as piano black. The plateable plastic material may be plateable with chrome with different finishes such as bright or satin.

A multi-shot injection molding process is used to form the one-piece trim bezel. The multi-shot injection molding process of the disclosed invention may include two shots wherein a first co-molded part is joined with a second co-molded part in one operation. The multi-shot injection molding process of the disclosed invention may also employ more than two shots, for example, where one shot is for a first component (such as a plateable chrome ring), one shot is for a second component (such as a high gloss piano black element), and another shot is for a third component (such as a textured low gloss finish element).

Regardless of the number of shots, a two-piece mold having a highly polished surface for the second co-molded part is used. The mold heats the bezel cavity to between 80° C. and 180° C. prior to material injection followed by a rapid cool down. For example, and in the case of a two-shot process, the formed part is then subjected to a plating process during which time only the chrome is deposited on the surface of the plateable plastic material of the second co-molded part while the high-gloss surface or textured low gloss surface of the first co-molded part remains unplated. Alternative methods of heating the tool cavity may include, but are not limited to, electrical heat, steam, pressurized hot water, hot oil, and the like.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
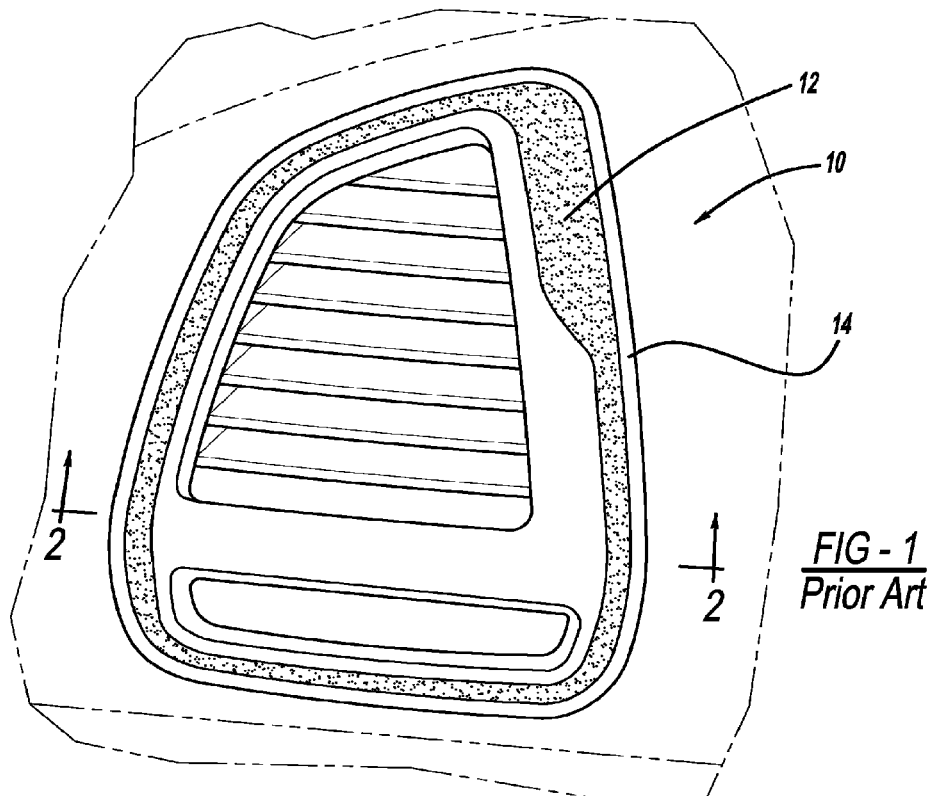
FIG. 1 illustrates a front view of an example of a two-piece trim bezel according to the prior art.
Figure 2:
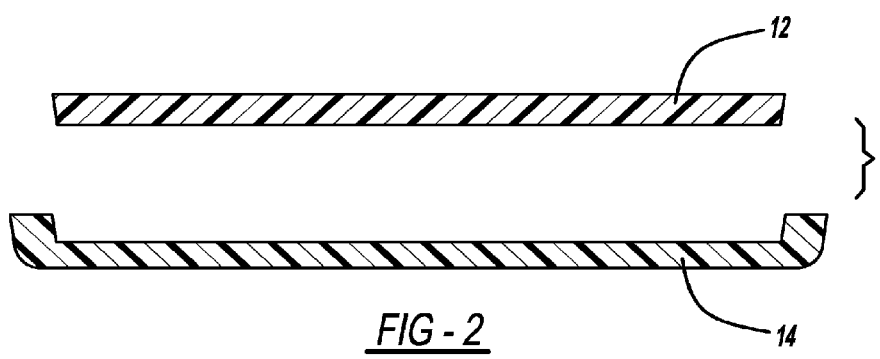
FIG. 2 illustrates a sectional view of the two-piece trim bezel of the prior art shown in FIG. 1.

In the following figures, the same reference numerals will be used to refer to the same components. In the following description, various operating parameters and components are described for different constructed embodiments. These specific parameters and components are included as examples and are not meant to be limiting.

Figure 3:
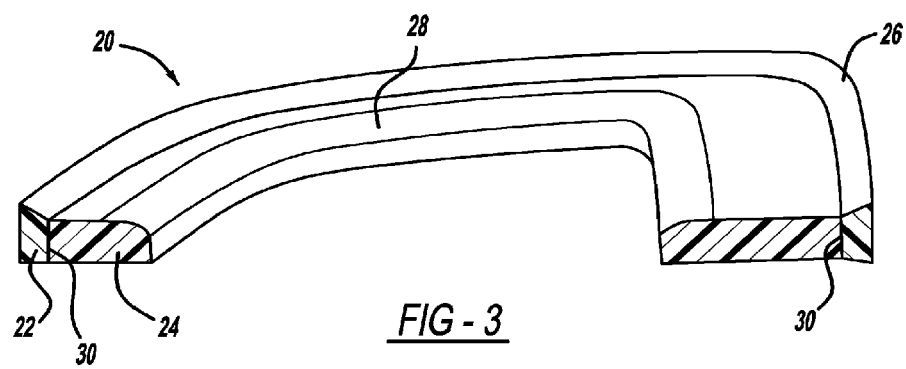
FIG. 3 illustrates a partially perspective, sectional view of a one-piece trim bezel according to one embodiment of the disclosed invention.
Figure 4:
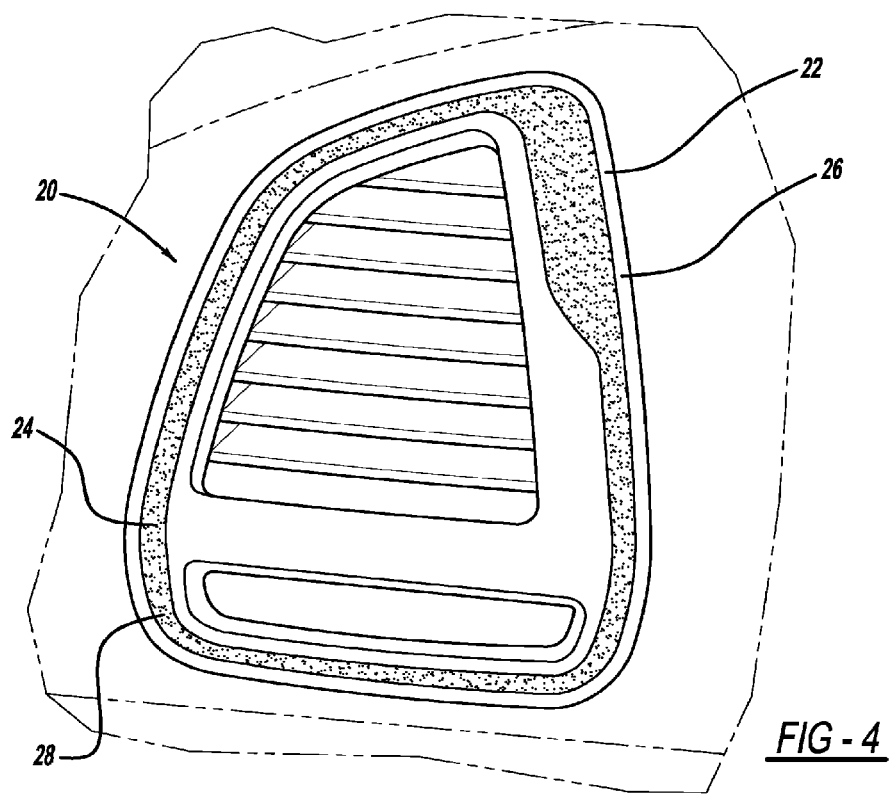
FIG. 4 is a front view of a one-piece trim bezel according to the disclosed invention.

With reference to FIGS. 3 and 4, an exemplary one-piece trim bezel of the disclosed invention is shown and is generally illustrated as 20. It is to be understood that the shape and overall design of the one-piece trim bezel 20 is only presented for illustrative purposes and is not intended as being limiting as any of a number of designs and configurations can be produced using two co-molded components according to the disclosed invention.

The one-piece trim bezel 20 of the disclosed invention is formed from two or more co-molded components including at least a plateable portion 22 and a non-plated or colored portion 24. The plateable portion 22 may be formed from any one of several plateable polymerizable materials including without limitation ABS or PC/ABS plastic. More generally, the plateable portion 22 can be any polymerizable material which can be plated. The colored portion 24 may be formed from any of several polymerizable materials capable of achieving a high gloss finish or textured low gloss finish upon molding, such as a polycarbonate (PC) or a PC blend in which the PC is the majority component. The color of the colored portion 24 may be any color as required to match the color scheme of the vehicle interior, such as the popular bezel trim color of piano black.

The plateable portion 22 is plated with a plated finish 26 which is preferably a chrome plated finish. The colored portion 24 includes an in-mold gloss finish 28.

The plateable portion 22 and the colored portion 24 are co-molded. The co-molding process, described below, results in a portion joint 30 which is not discernable when the one-piece trim bezel 20 is viewed by a vehicle occupant.

Figure 5:
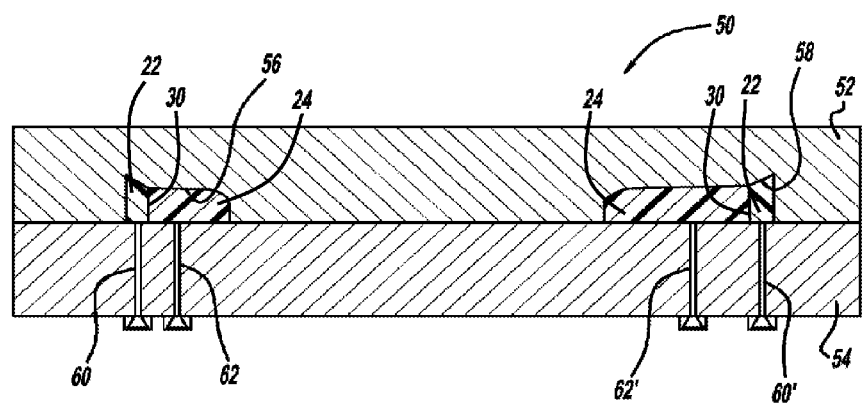
FIG. 5 is a sectional view of a preferred set of molds used in the production of the one-piece trim bezel of the disclosed invention.

The one-piece trim bezel 20 of the disclosed invention is formed by a two-shot injection molding process using a bezel mold 50 as shown in FIG. 5. With reference thereto, the bezel mold 50 includes a first half 52 and a second half 54. The first half 52 and the second half 54 are illustrated in FIG. 5 in their injection position in which the halves are positioned together.

The first half 52 of the bezel mold 50 includes a mold cavity 56 defined therein. The mold cavity 56 includes a polished surface or textured surface 58 against which the plateable portion 22 is injected.

For injection of the plateable portion 22, one or more injection ports 60, 60' are formed in the second half 54 of the bezel mold 50. For injection of the colored portion 24, one or more injection ports 62, 62' are formed in the second half 54 of the bezel mold 50.

In operation, the bezel mold 50 heats the mold cavity 56 to between 80° C. and 180° C. prior to injection. Once a temperature within this range has been achieved, the injection of the polymerized materials forming the plateable portion 22 and the colored portion 24 takes place in a single operation with these materials being injected into the mold cavity 56 by the injection ports 60, 60' and 62, 62' respectively.

After the polymerized materials forming the plateable portion 22 and the colored portion 24 have been injected into the mold cavity 56, the bezel mold 50 is subjected to a rapid cool down. The formed one-piece trim bezel (not shown) is then removed and is subjected to a plating process during which time chrome adheres only to the surface of the plateable portion 22 to form the plated finish 26 (shown in FIG. 3) while the high gloss finish of the colored portion 24 remains unplated.

Alternative methods of heating up the tool cavity may include, but are not limited to, electrical heat, steam, pressurized hot water, hot oil, and the like.

Figure 6:
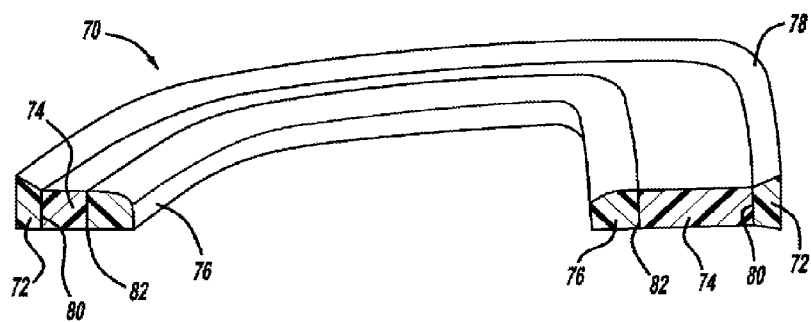
FIG. 6 illustrates a partially perspective, sectional view of a one-piece trim bezel according to another embodiment of the disclosed invention.

The description above relates to a two-component bezel and a method of making the two-component bezel. In addition, a multi-component bezel may be made from a multi-shot process. By way of example, a three-component bezel, generally illustrated as 70, is shown in FIG. 6. The bezel 70 includes a plateable portion 72, a first non-plated portion 74, and a second non-plated portion 76. The arrangement and number of components shown in FIG. 6 are intended as being suggestive and are not intended as being limiting. The plateable portion 72 may be formed from any one of several plateable polymerizable materials including without limitation ABS or PC/ABS plastic. More generally, the plateable portion 72 can be any polymerizable material which can be plated. The non-plated portions 74 and 76 may be formed from any of several polymerizable materials capable of achieving a high gloss finish or textured low gloss finish upon molding, such as a polycarbonate (PC) or a PC blend in which the PC is the majority component. The color of the non-plated portions 74 and 76 may be any color as required to match the color scheme of the vehicle interior.

The plateable portion 72 is plated with a plated finish 78 which is preferably a chrome plated finish. The non-plated portions 74 and 76 may have any of several finishes, such as a gloss finish (e.g., gloss piano black) and a textured low gloss finish.

The plateable portion 72 and the unplated portions 74 and 76 are co-molded. The co-molding process results in a first joint 80 between the plateable portion 72 and the first unplated portion 74 and a second joint 82 between the first unplated portion 74 and the second unplated portion 76. The joints 80 and 82 are not discernable when the one-piece trim bezel 70 is viewed by a vehicle occupant.

The foregoing discussion discloses and describes exemplary embodiments of the present invention. One skilled in the art will readily recognize from such discussion, and from the accompanying drawings and claims that various changes, modifications, and variations can be made therein without departing from the true spirit and fair scope of the invention as defined by the following claims.

The invention claimed is:

1. A method for forming a one-piece trim bezel, the bezel having a closed and endless loop shape, the method including:
    forming a mold having a first half, a second half, and a closed loop-shaped cavity formed entirely within said first half for the bezel;
    injecting a first material and a second material into respective ports of said mold, said first material being unplateable and said second material being plateable, said first material defining an inner circumference of the bezel and said second material defining an outer circumference of the bezel, said first and second materials being concentric with one another;
    removing said first and second materials from said mold after said first and second materials are co-molded together; and
    subjecting both said first and second materials, which are co-molded, to a plating process whereupon plating material adheres only to said second material.

2. The method of claim 1, wherein subjecting both said first and second materials to a plating process includes subjecting both said first and second materials to a chrome-plating process.

3. The method of claim 1 further comprising, heating said mold to a temperature that is in a range of 80 degrees Celsius and 180 degrees Celsius before injecting said first and second materials.

4. The method of claim 3 further comprising, cooling said mold after injecting said first and second materials and before removing said first and second materials.

5. The method of claim 1 wherein said first material defines one or both of a surface selected from the group consisting of a first surface having a gloss finish and a textured second surface having a gloss finish that avoids the need for painting, said gloss finish of said first surface being higher than said gloss finish of said second surface, further wherein said gloss finish of said first surface is achieved without paint when cooled and co-molded with said second material.

6. The method of claim 5, wherein said gloss finish of said first surface includes a piano-black finish.

7. A method for forming a one-piece trim bezel, the bezel having a closed and endless loop shape, the method including:
    forming a mold having a first half, a second half, and a closed loop-shaped cavity formed entirely within said first half for the bezel;
    injecting a first polymerizable material, a second polymerizable material, and a third polymerizable material into respective ports of said mold, said first and second polymerizable materials being unplateable and said third polymerizable material being plateable, said first polymerizable material defining an inner circumference of the bezel, said third polymerizable material defining an outer circumference of the bezel, and said second polymerizable material being injected between said first and third polymerizable materials, said first, second, and third polymerizable materials being concentric with one another;
    removing said first, second, and third polymerizable materials from said mold after said first, second, and third polymerizable materials have cooled and are co-molded together; and
    subjecting said first, second, and third polymerizable materials to a plating process whereupon plating material adheres only to said third polymerizable material.

8. The method of claim 7, wherein said first polymerizable material defines a first surface having a gloss finish and said second polymerizable material defines a textured second surface having a gloss finish that avoids the need for painting, said gloss finish of said first surface being higher than said gloss finish of said second surface, further wherein said gloss finish of said first surface is achieved without paint when cooled and co-molded with said second and third polymerizable materials.

9. The method of claim 8, wherein said gloss finish of said first surface includes a piano-black finish.

10. The method of claim 8, wherein subjecting said first, second, and third polymerizable materials to a plating process includes subjecting said first, second, and third polymerizable materials to a chrome-plating process.

11. The method of claim 8 further comprising, heating said mold to a temperature that is in a range of 80 degrees Celsius and 180 degrees Celsius before injecting said first, second, and third polymerizable materials.

12. A method for forming a single piece trim bezel, the bezel having a closed and endless loop shape, the method including the steps of:
    forming a bezel mold having a first half, a second half, a first injection port for a first polymerizable material, a second injection port for a second polymerizable material and a cavity for the bezel, said cavity being a closed loop, said first half having an interior projection extending between said cavity;
    positioning said first half and said second half of said bezel mold next to one another, said interior projection of said first half contacting said second half;
    injecting said first polymerizable material into said first injection port, said first polymerizable material being unplateable, said first polymerizable material defining an inner circumference of the bezel;
    injecting said second polymerizable material into said second injection port, said second polymerizable material being plateable, said second polymerizable material defining an outer circumference of the bezel;
    removing said single piece trim bezel from said bezel mold; and
    subjecting said single piece trim bezel to a plating process whereupon plating material adheres only to said second polymerizable material.

13. The method for forming a single piece trim bezel of claim 12 wherein said injection of said first polymerizable material and said second polymerizable material is a two-shot injection process.

14. The method for forming a single piece trim bezel of claim 12 further including the step of forming a third injection port in said bezel mold and injecting a third polymerizable material into said bezel mold, said third polymerizable material being unplateable said third polymerizable material being injected between said first and second polymerizable materials.

15. The method for forming a single piece trim bezel of claim 14 wherein said injection of said first polymerizable material, said second polymerizable material, and said third polymerizable material is a three-shot injection process.

16. The method for forming a single piece trim bezel of claim 12 wherein said cavity is heated to between 80° C. and 180° C. prior to material injection and thereafter said bezel mold is subjected to a cool down after injection of said first and second polymerizable materials.

17. The method for forming a single piece trim bezel of claim 12 wherein said cavity includes a first surface against which said first polymerizable material is injected and a second surface against which said second polymerizable material is injected, said second surface being a polished surface.

18. The method for forming a single piece trim bezel of claim 12, wherein said first polymerizable material defines one or both of a surface selected from the group consisting of a first surface having a gloss finish and a textured second surface having a gloss finish that avoids the need for painting, said gloss finish of said first surface being higher than said gloss finish of said second surface, further wherein said gloss finish of said first surface is achieved without paint when cooled and co-molded with said second polymerizable material forms an unpainted high gloss surface in said bezel mold.

\* \* \* \* \*